(No Model.)

O. B. EVANS.
TRAP FOR SINKS, &c.

No. 391,600. Patented Oct. 23, 1888.

WITNESSES:
Th. Rollé.
James F. Kelly.

INVENTOR:
O. B. Evans.
BY Biedersheim & Kintner
ATTORNEYS.

UNITED STATES PATENT OFFICE.

OTHNIEL B. EVANS, OF PHILADELPHIA, PENNSYLVANIA, ASSIGNOR OF ONE-HALF TO GEORGE W. NOCK, OF SAME PLACE.

TRAP FOR SINKS, &c.

SPECIFICATION forming part of Letters Patent No. 391,600, dated October 23, 1888.

Application filed December 31, 1887. Serial No. 259,481. (No model.)

*To all whom it may concern:*

Be it known that I, OTHNIEL B. EVANS, a citizen of the United States, residing in the city and county of Philadelphia, State of Pennsylvania, have invented a new and useful Improvement in Traps for Sinks, &c., which improvement is fully set forth in the following specification and accompanying drawings.

My invention consists of a trap having a valve which is held closed or seated by the action of a crank, thus avoiding the use of springs and independent weights.

Figure 1:
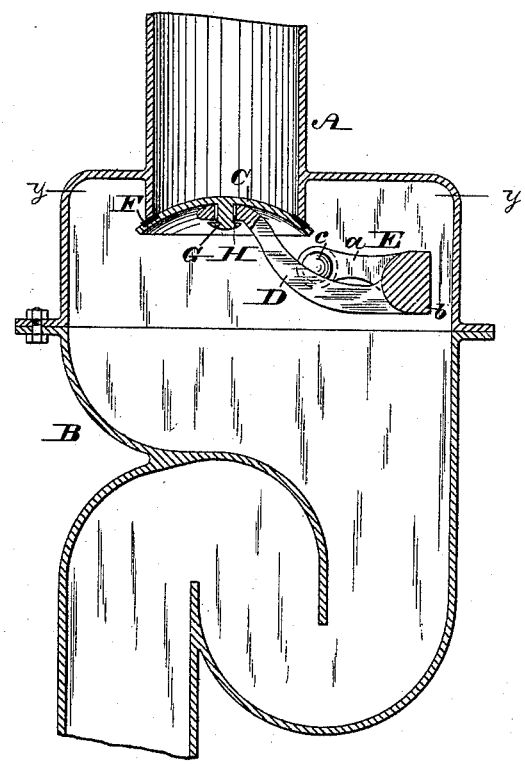
Figure 2:
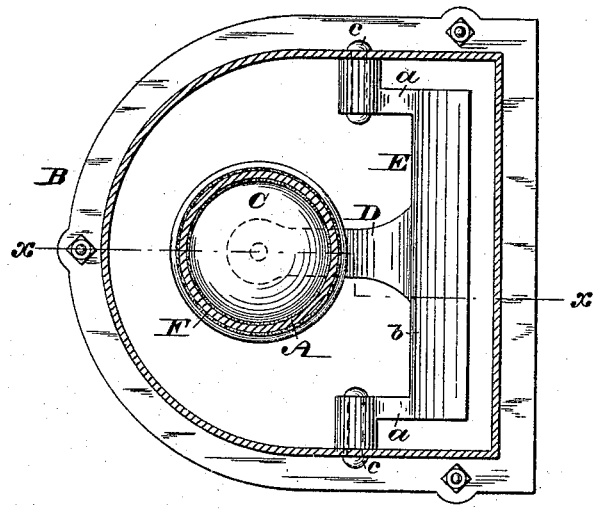

Figure 1 represents a vertical section on line $x$ $x$, Fig. 2, of a trap embodying my invention. Fig. 2 represents a horizontal section thereof on line $y$ $y$, Fig. 1.

Similar letters of reference indicate corresponding parts in the two figures.

Referring to the drawings, A represents a pipe leading from a sink, basin, &c., and connected with the trap-chamber B.

C represents a valve, which closes upwardly against the bottom of the pipe A as its seat. Attached to the valve is an arm, D, which supports the same, and is secured to or formed with a crank, E, the latter being mounted within the chamber B and consisting of the side arms, $a$, and cross-bar $b$, the pins, screws, or pivots $c$ of the crank passing through openings in said arms and secured to the walls of the chamber.

It will be seen that the arm D radiates from the bar $b$ between the arms $a$ and in the same direction as said arms, or, in other words, on the axial side of the crank, and that owing to the connection of the bar with the ends of the arms opposite to the axes of the latter the tendency of the crank is to lower on the side having said bar $b$ as a weight, and thus raise the arm D, whereby the valve is held firmly on its seat on the pipe A.

When the pipe A receives or contains sufficient water to overcome the holding power of the crank, the valve opens and permits the escape of the water into the chamber B, after which the valve quickly closes. Should there be back-pressure, due to sewer-gas, said pressure is exerted on the valve against the under side thereof, thus forcing the valve more tightly on its seat and preventing the entrance of the gas into the pipe A. The valve is preferably concavo-convex, the convex face having a groove to receive packing F, which serves to make a tight joint for the valve. The valve is connected with the arm D by means of a pin, G, which freely enters an opening, H, in the upper or outward end of the arm, thus permitting the valve to roll to a certain extent, and thereby properly seat itself on the pipe A should there be an inequality in the edge of the latter or any obstacle resting thereagainst.

It will be seen that owing to the disposition of the arm on the crank I dispense with springs or independent weights for returning the valve to its closed position and holding it on its seat.

I am aware that it is not new to construct a valve having its seat located above the same and provided with a pivoted weighted arm, which is adapted to force the valve upward and in contact with its seat; but I am not aware that the construction herein described and illustrated, and in which the valve has a convex upper face and is connected to the operating-arm, so as to permit it to adjust itself thereon for the purpose mentioned, is old. Neither is it thought to be common to connect said arm to the cross-bar of a crank the pivotal connections of the side arms of which are between the arms and valve-connection and the cross-bar of the crank.

Having thus described my invention, what I claim as new, and desire to secure by Letters Patent, is—

1. A valve-seat, a valve having an arm connected therewith at one end, a cross-bar connected to the other end of said arm, side arms to the ends of said cross-bar and extending therefrom on the same side as the valve-arm and having pivotal connection with a suitable support, said parts being combined substantially as and for the purpose set forth.

2. A chamber having an inlet-pipe, the lower end of which forms a valve-seat, the valve C, the arm D, connected with said valve C, the cross-bar $b$, connected to arm D, and the side arms, $a$, secured to the cross-bar and pivotally attached to the walls of the said chamber, the said connection of arm D and cross-bar $b$ being on the axial side thereof, substantially as and for the purpose set forth.

3. A chamber having an inlet-pipe with an end thereof forming a valve-seat, a convex-concavo valve with pin G, the arm D, having the opening H, the cross-bar b, having the side bars, a, connected to the ends thereof and extending therefrom on the same side as the valve-arm, and the pivots c, securing said bars a to the wall of the chamber, said parts being so combined that the fall of said side arms and cross-bar seats said valve, substantially as described.

O. B. EVANS.

Witnesses:
JOHN A. WIEDERSHEIM,
A. P. JENNINGS.